United States Patent
Wang et al.

(10) Patent No.: US 10,042,130 B1
(45) Date of Patent: Aug. 7, 2018

(54) LATCH FITTING AND LATCHING MECHANISM FOR AN OPITCAL TRANSCEIVER, OPTICAL TRANSCEIVER INCLUDING THE SAME, AND METHODS OF LATCHING AND DELATCHING AN OPTICAL TRANSCEIVER

(71) Applicant: Source Photonics (Chengdu) Company Ltd., Chengdu (CN)

(72) Inventors: Jinlin Wang, Chengdu (CN); Yizhi Zeng, Chengdu (CN)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 0 days.

(21) Appl. No.: 15/627,825

(22) Filed: Jun. 20, 2017

(51) Int. Cl.
  *G02B 6/38* (2006.01)
  *G02B 6/42* (2006.01)
  *H04B 10/40* (2013.01)

(52) U.S. Cl.
  CPC ......... *G02B 6/3897* (2013.01); *G02B 6/3893* (2013.01); *G02B 6/4246* (2013.01); *G02B 6/4256* (2013.01); *H04B 10/40* (2013.01)

(58) Field of Classification Search
  None
  See application file for complete search history.

(56) References Cited

U.S. PATENT DOCUMENTS

| | | | | |
|---|---|---|---|---|
| 7,325,975 | B2 * | 2/2008 | Yamada | G02B 6/4292 385/54 |
| 7,429,185 | B1 * | 9/2008 | Wu | H01R 13/6275 439/372 |
| 8,724,955 | B2 * | 5/2014 | LaVoie | H01R 13/6335 385/134 |
| 8,794,848 | B2 * | 8/2014 | Sasaki | G02B 6/4246 385/53 |
| 8,939,658 | B2 * | 1/2015 | Heimbuch | G02B 6/36 385/88 |
| 9,028,155 | B2 * | 5/2015 | Wang | G02B 6/4261 385/92 |
| 9,063,308 | B2 * | 6/2015 | Heimbuch | G02B 6/36 |
| 9,423,579 | B2 * | 8/2016 | Koutrokois | G02B 6/4277 |
| 9,551,847 | B2 * | 1/2017 | Wang | G02B 6/423 |
| 9,720,189 | B1 * | 8/2017 | Wang | G02B 6/3893 |
| 9,793,667 | B1 * | 10/2017 | Park | H01R 27/02 |
| 9,841,568 | B2 * | 12/2017 | Wang | G02B 6/3893 |
| 9,857,545 | B2 * | 1/2018 | Koutrokois | G02B 6/4292 |

(Continued)

Primary Examiner — Andrew Jordan
(74) Attorney, Agent, or Firm — Andrew D. Fortney; Central California IP Group, P.C.

(57) ABSTRACT

A latch fitting, a (de)latching mechanism, and an optical transceiver including the same are disclosed. The latch fitting includes a latch body, a catch extending from a first end of the latch body, a latch tail extending from an opposite end of the latch body, first and second wings extending from the latch body in opposite or complementary directions, and a spindle around which the latch fitting is rotatable. The latch tail is configured to engage with a latch handle to latch and de-latch the optical transceiver. Thus, the (de)latching mechanism includes the latch fitting and the latch handle. The present latch fitting, (de)latching mechanism and optical transceiver are more robust and less susceptible to damage than conventional latch fitting, (de)latching mechanisms, and optical transceivers.

20 Claims, 6 Drawing Sheets

(56) References Cited

U.S. PATENT DOCUMENTS

| | | | |
|---|---|---|---|
| 2011/0206328 A1* | 8/2011 | Wang | G02B 6/4246 385/94 |
| 2013/0322832 A1* | 12/2013 | Wang | G02B 6/4261 385/92 |
| 2014/0104808 A1* | 4/2014 | Koutrokois | G02B 6/4246 361/818 |
| 2014/0254993 A1* | 9/2014 | Koutrokois | G02B 6/4261 385/92 |
| 2015/0147032 A1* | 5/2015 | Ista | G02B 6/3807 385/58 |
| 2015/0241646 A1* | 8/2015 | Wang | G02B 6/423 385/92 |
| 2017/0219781 A1* | 8/2017 | Wang | G02B 6/3825 |
| 2017/0324194 A1* | 11/2017 | Song | H01R 13/65802 |

* cited by examiner

LATCH FITTING AND LATCHING MECHANISM FOR AN OPITCAL TRANSCEIVER, OPTICAL TRANSCEIVER INCLUDING THE SAME, AND METHODS OF LATCHING AND DELATCHING AN OPTICAL TRANSCEIVER

FIELD OF THE INVENTION

The present invention relates to the field of optical transceivers, especially to latch fittings and (de)latching mechanisms for optical transceivers, optical transceivers including such latch fittings and (de)latching mechanisms, and methods of latching and delatching an optical transceiver including such latch fittings and (de)latching mechanisms.

DISCUSSION OF THE BACKGROUND

Optical or optoelectronic transmitter-receiver modules (optical transceivers for short) are utilized primarily to convert electrical information to optical information and optical information to electrical information, and to transmit and receive optical information over or from an optical fiber. Generally, optical transceivers include optoelectronic devices, electrical circuits and electrical and optical interfaces, and play an important role in optical fiber communication systems and optical networks. Various package types for optical transceivers can be classified as SFP, GBIC, XFP, etc. SFP optical transceivers comply with a small form-factor package standard or specification and are hot-pluggable, which enables SFP optical transceivers to be connected to or disconnected from networking or communications equipment when the power to the equipment is on. As SFP optical transceivers may be inserted and extracted frequently when in use, the optical transceivers benefit from a built-in or integrated latching and de-latching mechanism to secure the optical transceiver in a cage or socket in the networking or communications equipment and free the optical transceiver from the cage or socket. Such latching and de-latching mechanisms should work smoothly, without need for excessive force and without risking damage to the optical transceiver or the networking or communications equipment.

Some conventional (de)latching mechanisms for optical transceivers operate by forcing a projection on a latch body into a hole or opening in the cage or socket to latch the transceiver, and retracting the projection to de-latch the transceiver. In some cases, the projection is at one end of a lever, and the other end of the lever is connected to a handle or pull-tab. When de-latching, lifting the handle or pull-tab retracts the projection to release it from the corresponding hole or opening in the cage or socket. However, the handle or pull-tab does not always cause the projection to retract from the hole or opening, and structures on the latch body and or the optical transceiver involved in latching and de-latching may break, leading to damage to the optical transceiver and/or the cage or socket, and even device failure in some cases.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide a latch fitting, a de-latching mechanism and optical transceivers using the same. One aspect of the present invention relates to a latch fitting, comprising a latch body, a catch extending from a first end of the latch body, a latch tail extending from a second end of the latch body opposite from the first end, first and second wings extending from the latch body in opposite or complementary directions, and a spindle around which the latch fitting is rotatable. The latch tail is configured to engage with a latch handle to latch and de-latch an optical transceiver including or equipped with the latch handle and the latch fitting.

The latch tail may comprise one or more portions or sections configured to engage with the latch handle and that are parallel or coplanar (e.g., that have one or more major surfaces that are parallel or coplanar) with the latch body. The one or more portions or sections configured to engage with the latch handle may include an engagement section having upper and lower surfaces that are not coplanar with the latch body. In some embodiments where the latch handle comprises a cam, the latch tail may comprise an extension section, a transition section, and a cam engagement section, where the cam engagement section is configured to engage with the cam on the latch handle.

In some embodiments of the latch fitting, the first wing includes a first depression configured to secure a first elastic piece, the second wing includes a second depression configured to secure a second elastic piece, and the first and second elastic pieces are configured to maintain the latch fitting in a latched state when assembled with the latch handle on the optical transceiver. For example, the first and second wings may each comprise a depression configured to accommodate and/or secure an end of the first and second elastic pieces, respectively. In other or further embodiments, the directions of the first and second wings are opposite from each other and perpendicular to an axis defined by the first and second ends of the latch body.

Another aspect of the present invention relates to a (de)latching mechanism for an optical transceiver having a housing, comprising the present latch fitting and the latch handle. The latch handle is configured to engage with the latch fitting and is securable to the housing. The latch handle is further configured to (i) latch the latch fitting when the latch handle is in a first position with respect to a front surface (e.g., a face plate around an optical port) of the optical transceiver and (ii) delatch the latch fitting when the latch handle is in a second, different position with respect to the front surface of the optical transceiver.

Similar to the present latch fitting, the first and second wings of the (de)latching mechanism may include first and second depressions configured to secure first and second elastic pieces, respectively, and the first and second elastic pieces may be configured to maintain the latch fitting in a latched state when the (de)latching mechanism is assembled on the optical transceiver. Also similar to the present latch fitting, the latch tail of the present (de)latching mechanism may have (i) at least one section with upper and lower surfaces that are not coplanar with the latch body and/or (ii)

one or more portions or sections configured to engage with the latch handle that are parallel or coplanar with the latch body.

Embodiments of the latch handle may include a pull bar, one or more arms connected to the pull bar, and a cam connected directly or indirectly to the one or more arms. The cam may comprise first and second connecting sections and a protrusion between the first and second connecting sections. The protrusion may be configured to force one or more portions or sections of the latch tail upward when the pull bar rotates from the first position to the second position. In further embodiments, the one or more arms comprise first and second arms connected to the pull bar, the latch handle further includes first and second shafts connecting the first and second connecting sections to the first and second arms, respectively, and the pull bar, the first and second arms, the first and second shafts and the cam form a closed loop. In some embodiments, the first and second connecting sections of the cam comprise first and second S-shaped bends at first and second ends of the protrusion.

A further aspect of the present invention relates to an optical transceiver, comprising the present (de)latching mechanism, a housing having a cavity, and an optical transmitter and an optical receiver within the housing. The latch fitting is configured to fit inside the cavity and to rotate around the spindle in the cavity. Embodiments of the optical transceiver may further comprise a single optical port that receives a single optical fiber connector configured to receive first optical signals from the optical transmitter and provide second optical signals to the optical receiver.

The optical transceiver may further comprise first and second elastic pieces that are supported in the cavity and that are configured to maintain the latch fitting in a latched state (e.g., in the absence of a force applied to the latch tail by the latch handle). As for the present latch fitting and (de)latching mechanism, the first wing of the latch fitting may include a first depression configured to secure the first elastic piece, and the second wing may include a second depression configured to secure the second elastic piece. The cavity may include a first hole configured to accommodate the first elastic piece and a second hole configured to accommodate the second elastic piece.

In some embodiments, the housing of the optical transceiver includes (i) first and second troughs configured to accommodate the spindle and/or (ii) one or more holding mechanisms configured to secure the latch handle. The present optical transceiver may comply with a small form-factor pluggable (SFP), small form-factor pluggable plus (SFP+), 10 Gigabit small form-factor pluggable (XFP) transceiver, quad SFP pluggable (QSFP), or gigabit interface converter (GBIC) standard or specification (e.g., for packaging dimensions and/or device functionality), and thus be or comprise an SFP, SFP+, XFP, QSFP, or GBIC transceiver.

Embodiments of the present latch fitting, (de)latching mechanism and optical transceiver are able to latch and delatch optical transceivers that duplexes (e.g., by WDM) transmitted and received optical signals over a single optical fiber connected through a single port, and may be more robust and less susceptible to damage than conventional latch fittings, (de)latching mechanisms, and optical transceivers. These and other objects and advantages of the present invention will become apparent to those skilled in the art upon review of the following detailed description of various embodiments and/or the accompanying drawings.

DETAILED DESCRIPTION

Figure 1:
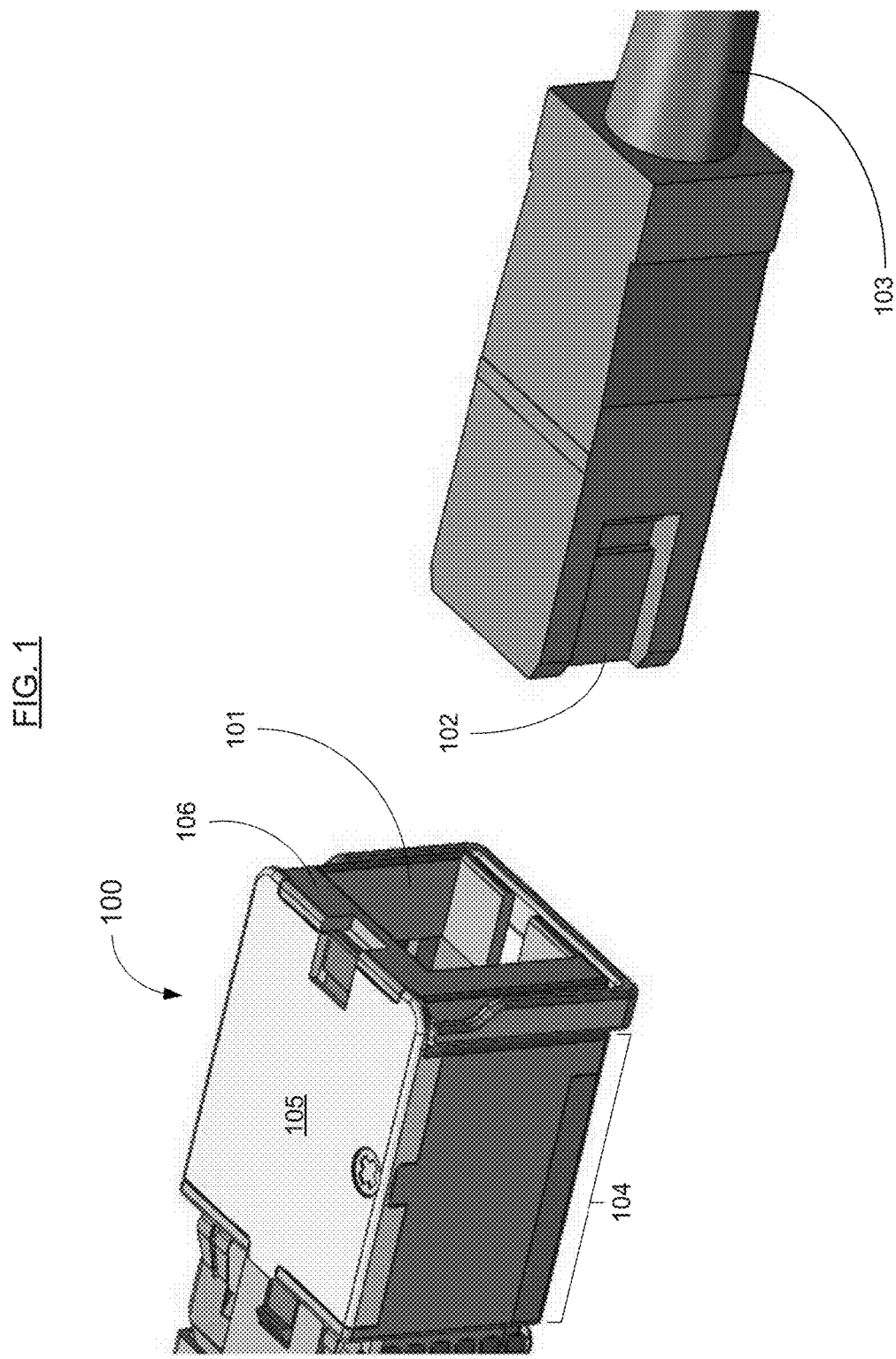
FIG. 1 shows the optical interface end of an exemplary optical transceiver with a port that receives an optical fiber connector with an optical fiber connected thereto.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

In the context of this application, the terms "signal" and "optical signal" refer to any known structure, construction, arrangement, technique, method and/or process for physically transferring data or information from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. In addition, the term "(de)latching mechanism" refers to an apparatus or structure that functions to latch (e.g., secure) an optical transceiver in and/or de-latch (e.g., release) an optical transceiver from a cage, socket or other opening in a host, system board or other piece of optical networking or optical communications equipment, and may include one or more integrated and/or separate pieces or units.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

In the present disclosure, a "major surface" of a structure or feature is a surface defined at least in part by the largest axis of the structure or feature (e.g., if the structure is round and has a radius greater than its thickness, the radial surface[s] is/are the major surface of the structure). In general, the length and width dimensions of a 3-dimensional object are the two largest dimensions of the object (the length being greater than the width when the two dimensions differ), and the thickness of the 3-dimensional object is the smallest dimension of the object, unless the context of the disclosure indicates otherwise.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

FIG. 1 shows an optical transceiver 100 comprising an optical port 101 that receives an optical fiber connector 102 configured to connect an end of an optical fiber 103 to the port 101. The optical transceiver 100 has an optical interface 104 at one end and an electrical interface at an opposite end (not shown). The optical transceiver 100 may include a cover or plate 105 over the optical interface 104 and a face plate 106 surrounding the optical port 101. The optical fiber 103 may comprise a standard optical fiber (e.g., having a transparent glass or plastic core, surrounded by a transparent cladding material with a lower index of refraction than the core, both of which are ensheathed in an opaque plastic buffer and/or coating) having one or more standardized dimensions (e.g., thickness, diameter, length, etc.).

The optical transceiver 100 may comply with a small form-factor pluggable (SFP), a small form-factor pluggable plus (SFP+), a 10 Gigabit small form-factor pluggable (XFP) transceiver, a quad SFP pluggable (QSFP), or a gigabit interface converter (GBIC) standardized form and/or functionality, and the optical fiber connector 102 may comprise a Standard Connector (SC), an SC-Dual Contact (SC-DC) connector, an SC Quattro Contact (SC-QC) connector, or a Lucent Connector (LC). The optical transceiver 100 may operate in a passive optical network (PON) which may use wavelength division multiplexing (WDM) for transmission and/or reception of different signals over different channels, such as a BPON (Broadband Passive Optical Network), EPON (Ethernet Passive Optical Network), GEPON (Gigabit Ethernet Passive Optical Network), or GPON (Gigabit Passive Optical Network).

Figure 2:
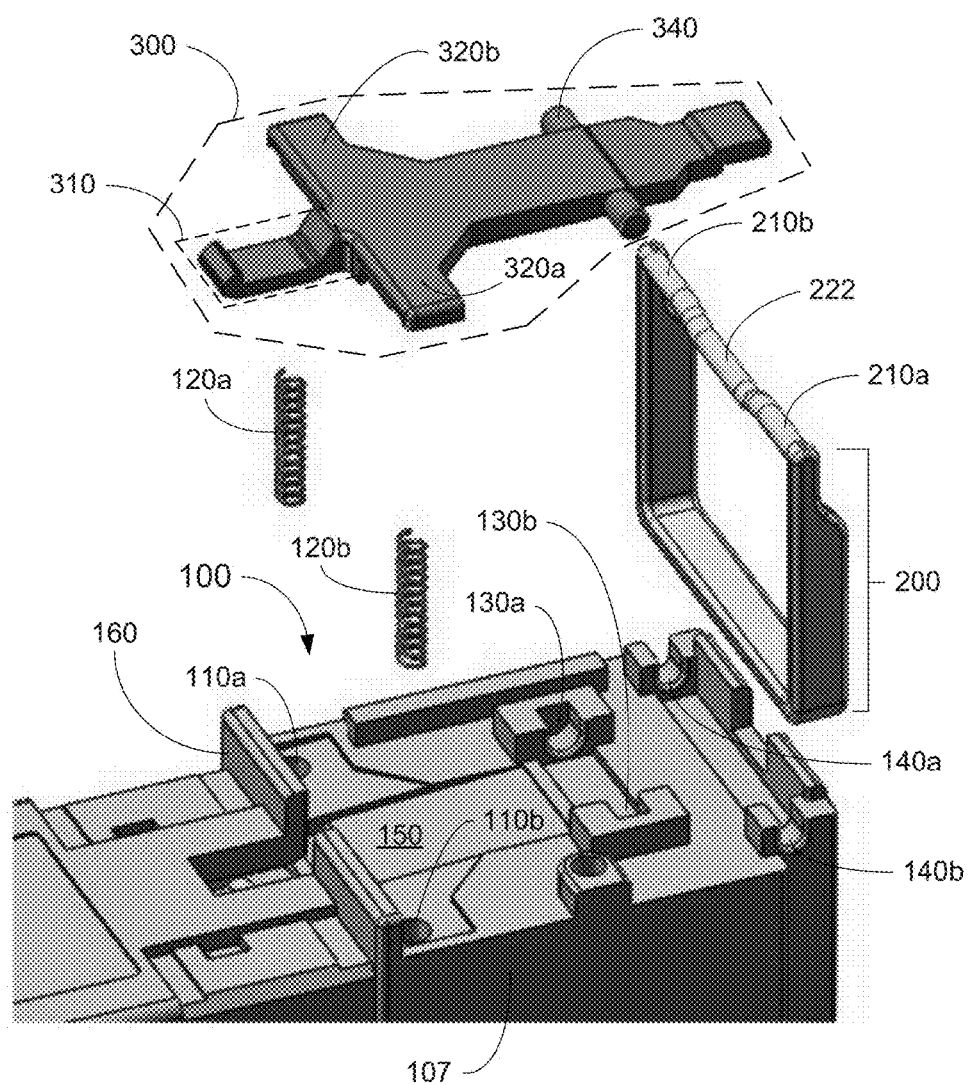
FIG. 2 shows an exploded view of part of the exemplary optical transceiver of FIG. 1, an exemplary latch fitting and an exemplary latch handle in accordance with one or more embodiments of the present invention.

FIG. 2 shows an expanded view of a part of the optical transceiver 100, a latch handle 200, and a latch fitting 300. The optical transceiver 100 has a housing 107 that includes first and second holes 110a-b, first and second troughs 130a-b, first and second holding mechanisms 140a-b, a cavity 150, and a barrier 160. The latch fitting 300 includes a catch 310, wings 320a-b, and a spindle 340. The latch handle 200 includes first and second shafts 210a-b and a cam 220 between the shafts 210a-b. An optical transmitter and an optical receiver may be within the housing 107 in a section (e.g., to the left of the barrier 160) that houses electrical components. The barrier 160 separates the optical port 102 (FIG. 1) from the section that houses electrical components. The optical transceiver 100 may include a cover (not shown in FIG. 2, but identified as cover or cap 105 in FIG. 1) over the latch handle 200 and the latch fitting 300.

The latch handle 200 causes the latch fitting 300 to rotate such that the catch 310 is driven down vertically when the pull bar 240 is rotated upward (e.g., away from the optical port 102). The latch fitting 300 is configured to fit in the cavity 150 when the spindle 340 rotates in the troughs 130a-b during de-latching operations (e.g., when the pull bar 240 and/or the latch handle 200 are rotated). The cavity 150 has a depth and/or shape configured to control the rotation of the latch fitting 300. For example, the cavity 150 has one or more shallow recessions configured to accommodate the wings 320a-b, a deeper recession configured to accommodate the latch body 305, and an even deeper recession or trench configured to accommodate the latch tail 310.

The first hole 110a in the cavity 150 is configured to accommodate a first elastic piece 120a, and the second hole 110b in the cavity 150 is configured to accommodate a second elastic piece 120b. The first and second elastic pieces 120a-b are configured to be between the housing 107 and the latch fitting 300 in order to maintain the latch fitting 300 in a latched state (e.g., in the absence of a downward force when the latch handle 200 and/or pull bar 240 are rotated). Each of the first and second elastic pieces 120a-b may comprise a spring. Alternatively, the elastic pieces 120a-b may comprise a relatively firm, but compressible and elastic, material configured to apply an upward (e.g., latching) force to the wings 320a-b, but compress relatively easily when the latch handle 200 and/or pull bar 240 are rotated. The elastic pieces 120a-b may be cylindrical or have a square, rectangular, oval, hexagonal or other cross-section (e.g., along its length), and have an end with a shape that mates with or complements the first and second holes 110a-b. The height of each of the first and second holes 110a-b may be of from about 5% to 50% of the height of the housing 107. The height (or length) of each of the first and second elastic pieces 120a-b may be 1.5-10 times greater than the height of the first and second holes 110a-b (or any height, length or range of heights or lengths therein), although the invention is not limited thereto.

The first and second troughs 130a-b are configured to accommodate the spindle 340 around which the latch fitting 300 rotates. Each of the first and second troughs 130a-b may have a curved shape configured to accommodate the contours of the spindle 340. The curved shape allows the spindle 340 to rotate or revolve in the first and second troughs 130a-b unimpeded. The first and second troughs 130a-b may have a depth 1.1-3 times greater than a diameter of the spindle 340 (or any depth or range of depths therein), although the invention is not limited thereto. Alternatively, the first and second troughs 130a-b may be replaced with raised blocks (e.g., rectangular blocks) having recessions in the facing surfaces configured to accommodate opposed ends of the spindle 340.

The first and second holding mechanisms 140a-b are configured to accommodate first and second shafts 210a-b connected to the latch handle 200, respectively. Each of the first and second holding mechanisms 140a-b may be U-shaped or comprise a trough, and/or have a structure similar or identical to that of the first and second troughs 130a-b. Alternatively, each of the first and second holding mechanisms 140a-b may comprise a hole or opening (e.g., in a raised block, similar to that described above for the first and second troughs 130a-b). Each of the first and second holding mechanisms 140a-b may have a depth 1.1-3 times greater (or a diameter 1.0-1.2 times greater) than the diameter of the first and second shafts 210*a-b* (or any depth, diameter or range of depths or diameters therein), although the invention is not limited thereto.

The latch fitting 300 and the latch handle 200 form a latching mechanism when assembled together on the housing 107. The latch handle 200 is further described with respect to FIG. 3, and the latch fitting 300 is further described with respect to FIG. 4. The latching mechanism is further described with respect to FIG. 5.

Figure 3:
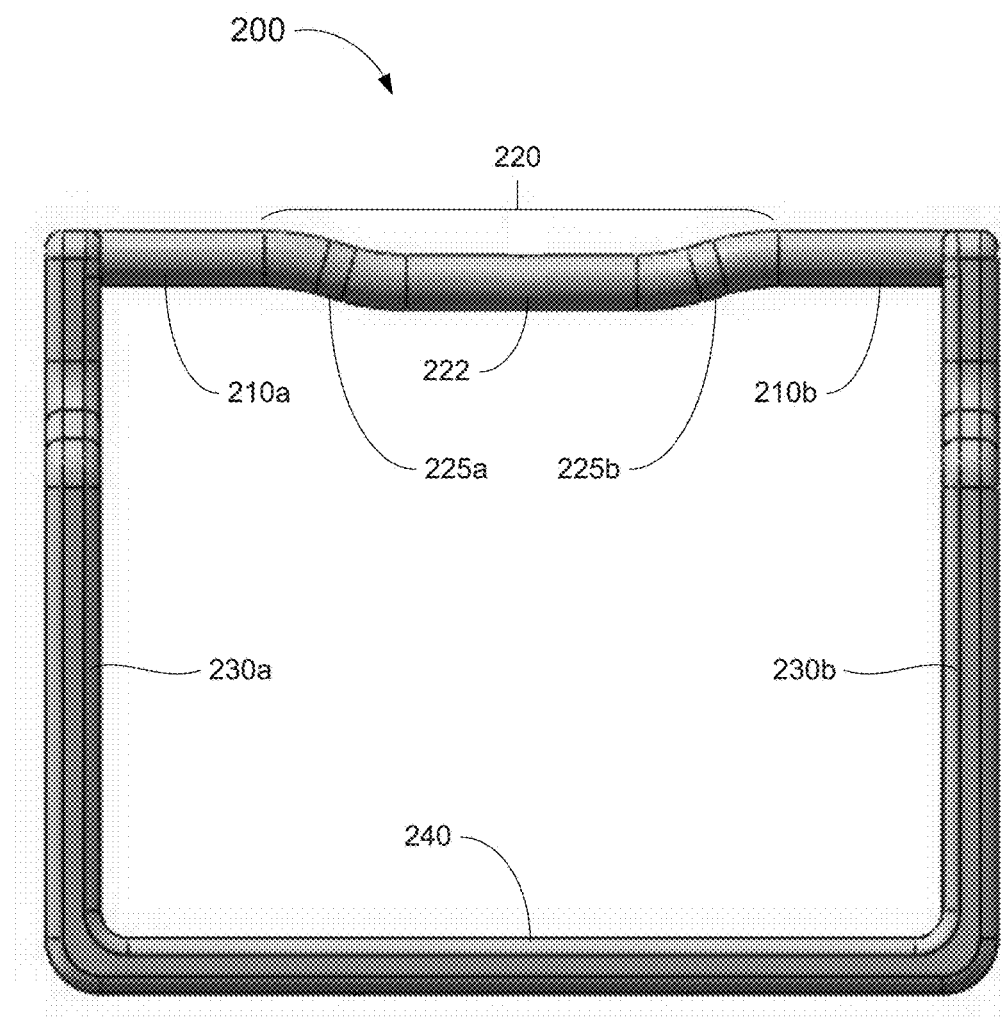
FIG. 3 is a face-on view of the exemplary latch handle of FIG. 2, in accordance with one or more embodiments of the present invention.

FIG. 3 is an end-on (e.g., front or rear) view of the latch handle 200. The latch handle 200 comprises a cam 220, first and second shafts 210*a-b*, first and second arms 230*a-b*, and a pull bar 240. The cam 220 includes a protrusion 222 and first and second S-shaped bends 225*a-b* at first and second ends of the protrusion 222, respectively. The latch handle 200 generally has dimensions that do not block the optical fiber connector 102 from entering or exiting the optical port 101 (FIG. 1) and enabling it to stop rotating when it encounters the housing 107 (e.g., in the latching direction).

The cam 220 (FIG. 3) is connected to the first and second shafts 210*a-b* by the first and second bends 225*a-b*, respectively. The cam 220 and the first and second shafts 210*a-b* may independently have a diameter of from 0.5-2 mm or any diameter or range of diameters therein, although the invention is not limited thereto. For example, the protrusion 222 may have an oval, elliptical or ovoid cross-section with a long axis that is 1.01-3 times greater than the short axis. The protrusion 222 may protrude downward (e.g., toward the pull bar 240) and/or to the front of the optical transceiver 100 (e.g., away from the optical interface 104), and is configured to force the cam engagement section 366 of the latch tail 360 (FIG. 4) upward when the latch handle 200 is secured in the first and second holding mechanisms 140*a-b* and the pull bar 240 rotates from a first position (e.g., somewhat flat against the front of the optical housing 100) to a second position (e.g., rotated from 60° to 120° with respect to the first position, or any angle or range of angles therein).

The first and second arms 230*a-b* may be straight or bent. Each of the first and second arms 230*a-b* may have a first section with a relatively narrow width or diameter (e.g., equal to or substantially the same as the diameter of the first and second shafts 210*a-b*), and a second section with a relatively greater width or diameter (e.g., equal to or substantially the same as the width of the pull bar 240). There may also be a transitional section between the first and second sections of the arms 230*a-b*. The pull bar 240, the first and second arms 230*a-b*, the first and second shafts 210*a-b*, and the cam 220 may form a closed loop.

In alternative embodiments, there may be one arm 230 (e.g., one of the arms 230*a-b*), and thus no closed loop (e.g., a U-shaped or C-shaped structure). In further alternative embodiments, there may be one or two arms 230*a-b* and no pull bar 240 (e.g., an L-shaped or C-shaped structure). In other embodiments, there may be more than one cam 220, and more than two S-shaped bends 225*a-b* (e.g., two cams 220 with four S-shaped bends 225*a-b*). In addition, the pull bar 240 may have an exterior with a tacky surface (e.g., a coating or separate material layer, such as a polymer having some degree of tack or adhesive properties) to increase the user's ability to grip the pull bar 240.

When engaged with the latch fitting 300 and secured to the housing 107, the latch handle 200 is configured to latch the latch fitting 300 when the latch handle 200 is in a first position (e.g., a default position of the latch handle, such as an angle of 0° with respect to the front plate 106 of the housing 107 surrounding the optical port 101) and delatch the latch fitting 300 when the latch handle 200 is in a second position (e.g., when the latch handle is rotated at an angle of 60-120° [for example about 90°] with respect to the front plate 106). By rotating the pull bar 240, the latch handle 200 is moved from the first position to the second position, or from the second position to the first position. The rotation of the pull bar 240 is shown in more detail in FIGS. 6A-B.

Figure 4:
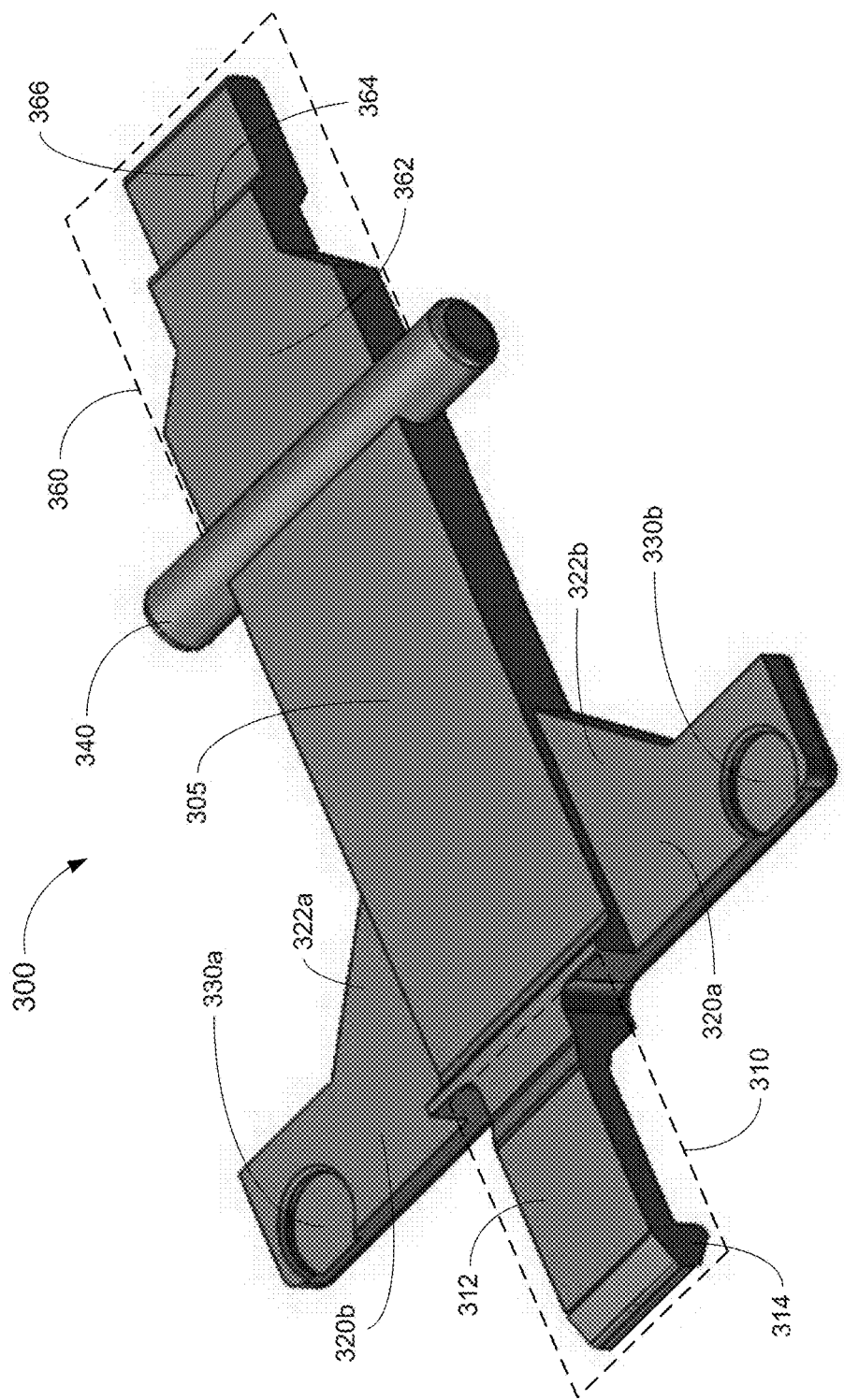
FIG. 4 is a perspective view of the exemplary latch fitting of FIG. 2, in accordance with one or more embodiments of the present invention.

FIG. 4 is a perspective view showing the underside of the latch fitting 300, relative to the view of the latch fitting 300 in FIG. 2. The latch fitting 300 comprises a latch body 305, a catch section 310, first and second wings 320*a-b*, first and second depressions 330*a-b*, a spindle 340, and a latch tail 360.

The latch body 305 may have a rectangular, square, oval, irregular or other shape (e.g., hourglass). The latch body 305 is integrated with and/or connected to the catch section 310, the wings 320*a-b*, the spindle 340, and optionally, the latch tail 360. Alternatively, the latch tail 360 and the latch body 305 are separately connected or adhered to the spindle 340, or the spindle 340 is inserted into a slot, trough or opening between the latch tail 360 and the latch body 305. The latch body 305 may have a length of from 5-10 mm, a width of from 2-5 mm, and a thickness of from 0.5-3 mm, or any length, width and/or thickness or range of lengths, widths and/or thicknesses therein, although the invention is not limited thereto.

The catch 310 is raised or lowered when the latch tail 360 engages with the latch handle 200, and the latch handle 200 is rotated (e.g., from a first position to a second position, where one of the first and second positions latches the optical transceiver 100 and the other position de-latches the optical transceiver 100). The catch 310 extends from a first end of the latch body and may comprise a hook, clip, fastener, extension, projection, clamp, clasp, grapple, pin or other latchable structure. For example, the catch 310 may comprise an extension section 312 and a projection 314. The extension section 312 extends from the latch body 305, and may have a length of from 5-75% of the length of the latch body 305, a width of from 10-100% of the width of the latch body 305, and a thickness of from 20-100% of the thickness of the latch body 305 or any length, width and/or thickness or range of lengths, widths and/or thicknesses therein, although the invention is not limited thereto.

The projection 314 is configured to fit in a hole or opening (not shown) in a cage, socket or shell in a networking or communications apparatus configured to receive and secure the optical transceiver 100 to the cage, socket or shell. The projection 314 may have a length of 10-100% of the width of the extension section 312, a width of from 5-50% of the length of the extension section 312, and a height of 1.2-5 times the thickness of the extension section 312 or any length, width and/or thickness or range of lengths, widths and/or thicknesses therein, although the invention is not limited thereto.

The first and second wings 320*a-b* extend from the latch body 305 in opposite or complementary directions. As shown, the first and second wings 320*a-b* are each at an angle of about 90° with respect to the length of the latch body 305. The directions of the first and second wings 320*a-b* are typically opposite from each other, and may be perpendicular to an axis defined by the first and second ends of the latch body 305. but as can be envisioned by the triangular corner pieces 322*a-b*, the first and second wings 320*a-b* may be at an angle of from about 30° to about 150° with respect to the length of the latch body 305 or any angle or range of angles therein, although the invention is not limited thereto.

As shown, the first and second wings 320*a-b* may comprise a rectangular or substantially rectangular section, with a triangular section 322*a-b* connecting the rectangular or substantially rectangular section to the latch body 305. The triangular section 322*a-b* may reinforce and/or strengthen the connection between the first and second wings 320*a-b* and the latch body 305. In alternative embodiments, the first and second wings 320*a-b* may have a square, rectangular, circular, semicircular, oval, irregular or other shape (e.g., a combination of the same or different shapes).

The first and second wings 320*a-b* may have a length of 0.5-2 times the width of the latch body or any length or range of lengths therein, although the invention is not limited thereto. The first and second wings 320*a-b* may have a width (which may vary along the length) of 0.1-0.5 times the width of the latch body 305, or any width or range of widths therein, although the invention is not limited thereto. The first and second wings 320*a-b* may have a thickness of from 25 to 100% of the thickness of the latch body 305 or any thickness or range of thicknesses therein, although the invention is not limited thereto.

The first wing 320*a* includes a first depression 330*a* configured to secure the first elastic piece 120*a*, and the second wing 320*b* includes a second depression 330*b* configured to secure the second elastic piece 120*b*. The first and second elastic pieces 120*a-b* are configured to maintain the latch fitting 300 in a latched state (e.g., in the absence of an opposing force on the latch tail 360 from the latch handle 200). In alternative embodiments, there may be more than two wings 320 connected to the latch body 305. For example, there may be two wings on each side of the latch body 305 (a total of four wings).

The spindle 340 may be cylindrical and may be located near the center of the latch fitting 300 (e.g., wherein the latch tail 360 has a length of at least 65% or 75% of the length of the latch body 305). The latch fitting 300 may rotate around the spindle 340 when the spindle 340 is in the first and second troughs 130*a* (FIG. 2), and the latch tail 360 engages with the latch handle 200 (e.g., the spindle acts as a pivot). The spindle 340 may have a diameter of from 0.5-2 mm (or any diameter or range of diameters therein) and a length of 1.2-3 times the width of the latch body 305 (or any length or range of lengths therein). Alternatively, the length of the spindle 340 may be greater than the width of the latch body 305 by 2-6 mm, although the invention is not limited thereto.

Figure 6A:
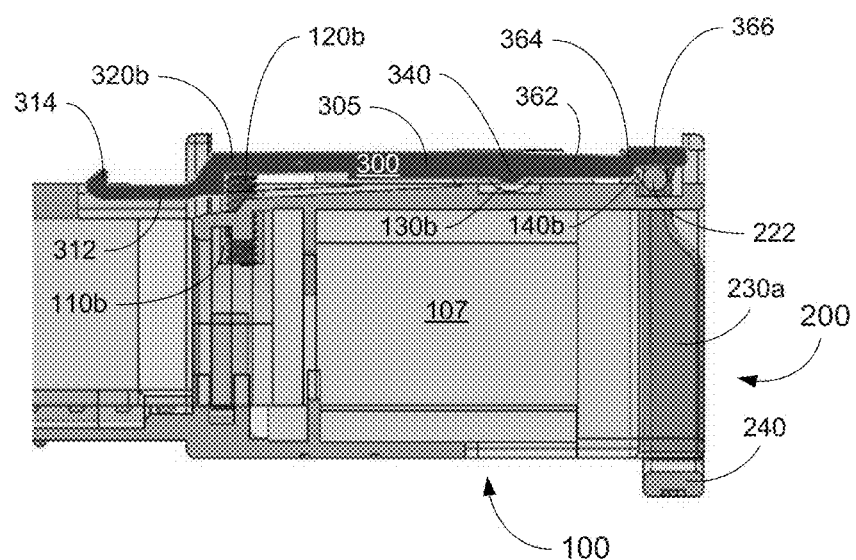
FIGS. 6A-B show side views of a cross-section of the assembly shown in FIG. 5 in latched and delatched configurations/positions, in accordance with an embodiment of the present invention.
Figure 6B:
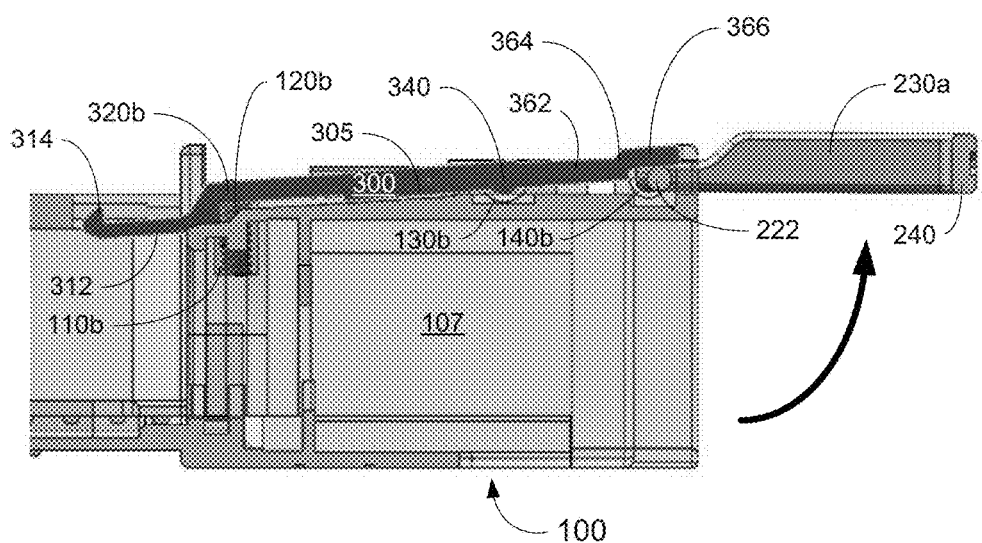

The latch tail 360 extends from a second end of the latch body 305 (opposite from the first end, where the catch 310 is located and/or connected) and is configured to engage with the latch handle 200 to latch and de-latch the optical transceiver 100 (e.g., as shown in FIGS. 6A-B and as described herein). When the latch tail 360 is driven up vertically by the latch handle 200, the catch 310 is lowered and disengages from the cage, socket or shell. When the latch handle 200 is returned to the first position (e.g., adjacent to the face plate 106 of the optical transceiver 100) the latch tail 360 is driven down vertically (e.g., by the first and/or second elastic pieces 120*a-b*), the catch 310 is raised and engages or locks with the cage or shell.

The latch tail 360 may have a length of 0.5-2 times the length of the latch body 305*a* or any length or range of lengths therein, although the invention is not limited thereto. The latch tail 360 may have a width (which may vary along its length) of 30-100% of the width of the latch body 305 or any width or range of widths therein, although the invention is not limited thereto. Finally, the latch tail 360 may have a thickness (which may vary along its length) of 20-100% of the thickness of the latch body 305 or any thickness or range of thicknesses therein, although the invention is not limited thereto. The latch tail 360 comprises an extension section 362, an optional transition section 364, and a cam engagement section 366.

The extension section 362 is connected to the spindle 340 and/or the latch body 305 at one end and the transition section 364 at an opposite end. The extension section 362 may have a length of 25-80% of the length of the latch tail 360 (or any length or range of lengths therein) and a width (which may vary along its length) of 30-100% of the width of the latch body 305 (or any width or range of widths therein), although the invention is not limited thereto. The extension section 362 may be coplanar with the latch body 305, although the invention is not limited thereto.

The transition section 364 connects the extension section 362 to the cam engagement section 366. The transition section 364 may not be coplanar with the latch body 305 and/or the extension section 362, but in the case where the transition section 364 is coplanar with the extension section 362, the transition section 364 may comprise a section where the width of the latch tail 360 varies (e.g., narrows from the interface with the extension section 362 to the interface with the cam engagement section 366). The transition section 364 may have a length of 1-50% of the length of the latch tail 360 (or any length or range of lengths therein), a width (which may vary along its length) of 25-100% of the width of the latch body 305 (or any width or range of widths therein), and a thickness of 50-100% of the thickness of the extension section 362 and/or the latch body 305, although the invention is not limited thereto.

The cam engagement section 366 is configured to engage with the latch handle 200 and may not be coplanar with the latch body 305. Whether the cam engagement section 366 is or is not be coplanar with the latch body 305, the cam engagement section 366 may have one or more major surfaces that are parallel with the latch body 305 and/or the extension section 362. The cam engagement section 366 may have a length of 10-50% of the length of the latch tail 360 (or any length or range of lengths therein), a width of 25-100% of the width of the extension section 362 and/or the latch body 305 (or any width or range of widths therein), and a thickness of 50-100% of the thickness of the extension section 362 and/or the latch body 305, although the invention is not limited thereto.

Figure 5:
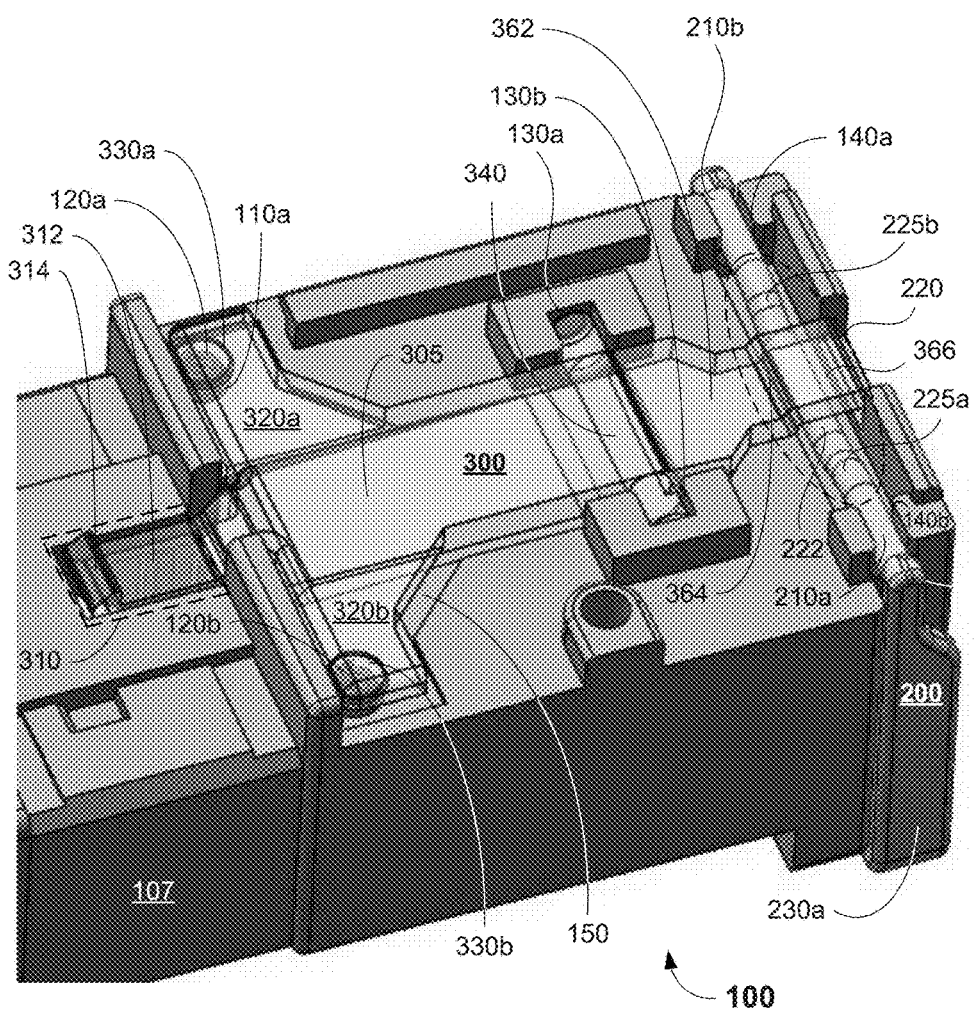
FIG. 5 shows a perspective view of the assembled optical transceiver, latch fitting and latch handle of FIG. 2, in accordance with an embodiment of the present invention.

FIG. 5 shows a perspective view of an upper surface of the optical transceiver 100 with the latching mechanism (e.g., the latch fitting 300 and the latch handle 200) assembled on the housing 107. A cover (not shown, but, e.g., cover 105 in FIG. 1) may be placed over the cam 220 and the shafts 210*a-b*.

A cavity or space in the housing 107 is configured to allow the catch 310 to be lowered unimpeded in the housing 107 when the latch fitting 300 rotates (e.g., the cam engagement section 366 of the latch tail 360 is forced away from the transceiver housing 107 by the cam 220 of the latch handle 200). The latch body 305 and the first and second wings 320*a-b* fit (partially or fully) in the cavity 150. Specifically, the first and second wings 320*a-b* fit in the shallow recession of the cavity 150, and the latch body 305 fits in the deeper recess of the cavity 150 (see FIG. 2). In alternative embodiments, the first and second wings 320*a-b* and the latch body 305 may fit in a recession or cavity 150 have a uniform depth. The first and second elastic pieces 120*a-b* (or ends thereof) fit in or on the holes 110*a-b* in the housing 107 and in the depressions 330a-b in the first and second wings 320a-b, which may be configured to accommodate an end of the first and second elastic pieces 120a-b, respectively.

The spindle 340 fits in or on the troughs or grooves 130a-b. The first shaft 210a fits in or on the holding mechanism 140b, and the second shaft 210b fits in or on the holding mechanism 140a. The cam engagement section 366 is configured to contact or engage the protrusion 222 of the cam 220. When the pull bar 240 (not shown) of the latch handle 200 is rotated (e.g., to de-latch the optical transceiver 100), the cam 220 rotates, and the protrusion 222 drives the cam engagement section 366 (and thus the latch tail 360) up vertically, away from the housing 107. Thus, the spindle 340 rotates in the troughs or grooves 130a-b, allowing the catch 310 to rotate in an opposite direction (e.g., like a seesaw). The amount of rotation of the pull bar 240 that de-latches the optical transceiver 100 may depend on the angle of the cam 220 with respect to the shafts 210a-b and/or the distance between the cam 220 and the cam engagement section 366 when the latch handle is in the latched position.

In the example shown in FIG. 5, the latched position may be a default position of the latching mechanism. In the latched position, the projection 314 is driven up vertically by the elastic pieces 120a-b, which in turn drives the cam engagement section 366 down vertically (e.g., towards the housing 107), a process that is allowed when the cam 220 is in a downward or retracted position (e.g., when the pull bar 240 is at an angle of 0° or close to 0° with respect to the face plate 107 [not shown]). The projection 314 engages with a hole (not shown) in a cage, socket or shell when driven up vertically (e.g., a latched or locked state), and disengages with the hole when driven down vertically (e.g., a de-latched or unlocked state). The elastic pieces 120a-b maintain the latch fitting 300 in a latched state (e.g., by providing a constant force to the underside of the latch fitting 300), and become compressed when the catch 310 is driven down vertically (e.g., during a de-latching operation). If one of the elastic pieces 120a-b fails, the other may still be functional, and thus the latching mechanism may still be operable.

FIGS. 6A-B show a side view of the optical transceiver 100 including the housing 107, the latch fitting 300, and the latch handle 200. When the latch fitting 300 is in a latched state (e.g., the default position, shown in FIG. 6A), the angle between the latch handle 200 and the face plate 106 (not shown) of the housing 107 may be about 0°. The position of the cam projection 222 between the first and second holding mechanisms 140a-b is shown. The projection 314 extends above the uppermost surface of the housing 107, enabling the optical transceiver 100 to be latched in a cage, socket or shell in a host or other networking or communications device. Such cages, sockets and shells frequently have dimensions allowing little to no space between the cage, socket or shell and the optical transceiver 100, so a projection 314 as shown can effectively latch the optical transceiver 100 in the cage, socket or shell.

When the latch fitting 300 is in a de-latched state (e.g., by pulling the pull bar 240 and rotating the latch handle 200 in the direction of the arrow shown in FIG. 6B), the angle between the latch handle 200 and the face plate 106 of the housing 107 may be about 90°. However, other angles of rotation of the latch handle 200, such as 60°, 75°, 80°, 100°, etc., may also effectively de-latch the optical transceiver 100. As long as projection 314 retracts to or below the uppermost surface of the housing 107, the de-latching mechanism can effectively de-latch the optical transceiver 100 from the cage, socket or shell.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A latch fitting, comprising:
   a latch body;
   a catch extending from a first end of the latch body;
   a latch tail extending from a second end of the latch body opposite from the first end, wherein the latch tail is configured to engage with a latch handle to latch and de-latch an optical transceiver including the latch handle and the latch fitting;
   first and second wings extending from the latch body in opposite or complementary directions; and
   a spindle around which the latch fitting is rotatable.

2. The latch fitting of claim 1, wherein the latch tail comprises one or more portions or sections configured to engage with the latch handle and that are parallel or coplanar with the latch body.

3. The latch fitting of claim 2, wherein the one or more portions or sections configured to engage with the latch handle include an engagement section having upper and lower surfaces that are not coplanar with the latch body.

4. The latch fitting of claim 1, wherein the first wing includes a first depression configured to secure a first elastic piece, the second wing includes a second depression configured to secure a second elastic piece, and the first and second elastic pieces are configured to maintain the latch fitting in a latched state when assembled with the latch handle on the optical transceiver.

5. The latch fitting of claim 1, wherein the directions of the first and second wings are opposite from each other and perpendicular to an axis defined by the first and second ends.

6. A (de)latching mechanism for an optical transceiver having a housing, comprising:
   the latch fitting of claim 1; and
   the latch handle, configured to engage with the latch fitting and securable to the housing, configured to latch the latch fitting when the latch handle is in a first position with respect to a front surface of the optical transceiver and delatch the latch fitting when the latch handle is in a second, different position with respect to the front surface of the optical transceiver.

7. The (de)latching mechanism of claim 6, wherein the first wing includes a first depression configured to secure a first elastic piece, the second wing includes a second depression configured to secure a second elastic piece, and the first and second elastic pieces are configured to maintain the latch fitting in a latched state when the (de)latching mechanism is assembled on the optical transceiver.

8. The (de)latching mechanism of claim 6, wherein the latch tail has at least one section with upper and lower surfaces that are not coplanar with the latch body, and the latch tail comprises one or more portions or sections configured to engage with the latch handle that are parallel or coplanar with the latch body.

9. The (de)latching mechanism of claim 6, wherein the latch handle includes:
a pull bar;
one or more arms connected to the pull bar; and
a cam connected directly or indirectly to the one or more arms.

10. The (de)latching mechanism of claim 9, wherein the cam comprises first and second connecting sections and a protrusion between the first and second connecting sections, configured to force one or more portions or sections of the latch tail upward when the pull bar rotates from the first position to the second position.

11. The (de)latching mechanism of claim 10, wherein the one or more arms comprise first and second arms connected to the pull bar, the latch handle further includes first and second shafts connecting the first and second connecting sections to the first and second arms, respectively, and the pull bar, the first and second arms, the first and second shafts and the cam form a closed loop.

12. The (de)latching mechanism of claim 10, wherein the first and second connecting sections comprise first and second S-shaped bends at first and second ends of the protrusion.

13. An optical transceiver, comprising:
the (de)latching mechanism of claim 6;
a housing having a cavity, wherein the latch fitting is configured to fit inside the cavity and to rotate around the spindle in the cavity;
an optical transmitter within the housing; and
an optical receiver within the housing.

14. The optical transceiver of claim 13, wherein the optical transceiver further comprises first and second elastic pieces that are supported in the cavity and that are configured to maintain the latch fitting in a latched state.

15. The optical transceiver of claim 14, wherein the first wing includes a first depression configured to secure the first elastic piece, and the second wing includes a second depression configured to secure the second elastic piece.

16. The optical transceiver of claim 14, wherein the cavity includes a first hole configured to accommodate the first elastic piece and a second hole configured to accommodate the second elastic piece.

17. The optical transceiver of claim 13, wherein the housing includes first and second troughs configured to accommodate the spindle.

18. The optical transceiver of claim 13, wherein the housing includes one or more holding mechanisms configured to secure the latch handle.

19. The optical transceiver of claim 13, further comprising a single optical port that receives a single optical fiber connector configured to receive first optical signals from the optical transmitter and provide second optical signals to the optical receiver.

20. A small form-factor pluggable (SFP), a small form-factor pluggable plus (SFP+), a 10 Gigabit small form-factor pluggable (XFP) transceiver, a quad SFP pluggable (QSFP), or a gigabit interface converter (GBIC) transceiver comprising the optical transceiver of claim 13.

* * * * *